Nov. 20, 1923.
C. S. SCHROEDER
ELECTRICAL CONTROLLING MEANS
Filed Aug. 18, 1921
1,474,447
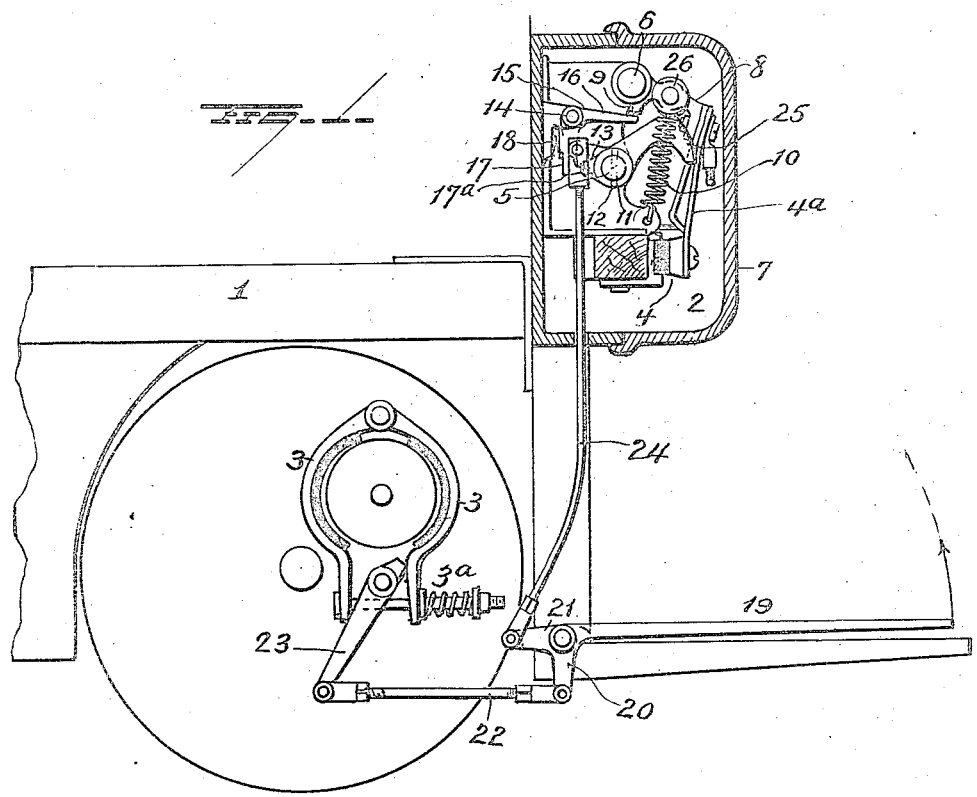
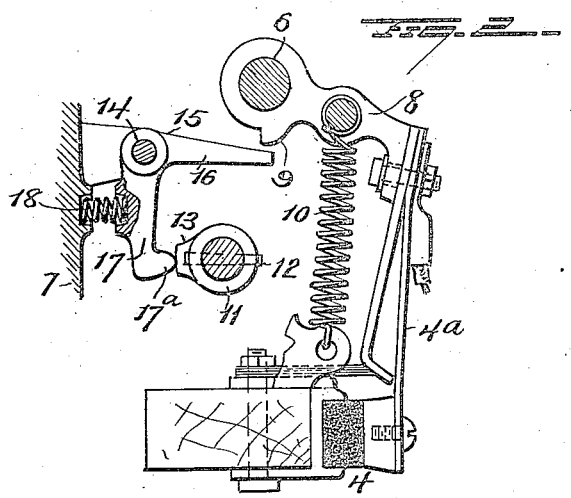
Inventor
C. S. Schroeder
By Seymour & Bright
Attorneys Patented Nov. 20, 1923.

1,474,447

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

ELECTRICAL CONTROLLING MEANS.

Application filed August 18, 1921. Serial No. 493,384.

*To all whom it may concern:*

Be it known that I, CHARLES S. SCHROEDER, a citizen of the United States, and a resident of Stamford, in the county of Fairfield and State of Connecticut, have invented certain new and useful Improvements in Electrical Controlling Means; and I do hereby declare the following to be a full, clear, and exact description of the invention, such as will enable others skilled in the art to which it appertains to make and use the same.

This invention relates to improvements in electrical controlling means, and more particularly to means for controlling the operation of a cut-out switch when the same is associated with an electrical controller in the motor circuit.

One object of my present invention is to provide simple and efficient means cooperable with a moving part of an electrical controller and with the movable member of a cut-out switch associated therewith, to prevent the closing of said switch (when the same shall have been previously opened by the operation of brake-controlling means while the controller is at an "on" position) until the controller drum is returned to "off" or first running position, whereby the closing of the motor circuit is prevented while the brake is applied and the controller drum is at other than "off" or first running position.

A further object is to so construct and arrange my improvements that the closing of the cut-out switch shall be controlled by drum of an electrical controller, so that said switch will be tripped and permitted to close when said controller drum is returned to "off" or first running position.

With these and other objects in view, the invention consists in certain novel features of construction and combinations of parts as hereinafter set forth and pointed out in the claims.

In the accompanying drawings, Figure 1 is a view illustrating the application of my invention; Figure 2 is an enlarged view showing features of my improvements.

In Figure 1 of the drawings, I have shown the application of my invention to an electrical controller and mechanical brake mechanism for an electrically driven industrial truck,—a portion of the framework of the latter being indicated at 1; the electrical controller at 2, and the brake at 3.

The electrical controller may be of the drum type and it will be included in the motor circuit in the usual manner. A cut-out switch 4 is also included in the motor circuit to effect the opening and closing of the latter under certain conditions. The details of construction of the controller drum and its cooperating contact fingers do not constitute parts of my present invention and need not be specifically described and illustrated herein to enable any one skilled in the art to make and use my improvements, nor is it necessary to show and describe the manner in which the controller and its cut out switch are included in circuit with a motor, as these features are well understood in the art and may be of any preferred construction and arrangement.

In the drawings, I have indicated the drum shaft at 5 and the operating shaft at 6,—it being understood that suitable gearing (not shown) will be provided for transmitting motion from the operating shaft to the drum,—all mounted in a suitable frame or casing 7.

The movable member 4ª of the cut-out switch 4 is supported by a carrier 8 mounted loosely on the operating shaft 6 and provided with a fixed lug 9. A spring 10 connected with the carrier 8 is operable to retain the cut-out switch closed or to close the same.

In the drawing, a portion of the controller drum is indicated at 11 and connected to the drum shaft 5 by means of a pin 12. The portion 11 of the drum is provided with a fixed lug 13.

Pivotally mounted on a stud 14 supported by the framework 7 intermediate of the drum and operating shafts, is a bell-crank lever 15,—the arm 16 of which is normally disposed adjacent to the lug 9 on the switch member carrier 8, and the arm 17 has a projection 17ª located adjacent to the part 11 of the controller. When the drum is at "off" position and the cut-out switch is closed as illustrated in Figure 2, the lug 13 on the controller drum will be in engagement with the projection 17ª of lever arm 17, and the bell-crank-lever will be held against the action of a spring 18 between the lever arm 17 and the frame or casing 7; in such position that the arm 16 of the bell-crank lever will be disposed out of the path of the lug 9 on the carrier 8.

In Figure 1 of the drawing, I have shown a brake pedal 19 suitably supported by the frame of the truck, and provided with two arms 20 and 21. The pedal arm 20 is connected, by a rod or link 22 with a lever 23 of the mechanical brake 3, and the spring $3^a$ of said brake will be operable to cause movement of the pedal when the brake is applied upon release of the pedal,—said brake being released when said pedal is depressed.

The arm 21 of the brake pedal 19 is connected by a rod 24 with one arm of a cam lever 25 mounted freely on the drum shaft 5 of the controller, and the other arm of said cam lever is cooperable with a roller 26 mounted on the carrier 8 of the movable member of the cut-out switch.

From the construction and arrangement of parts above described, it will be apparent that when the brake pedal is in depressed position as shown in Figure 1, the mechanical brake will be in released position; the cam lever 25 will be out of the path of the roller on the carrier 8, and the cut-out switch will be closed. When the brake pedal is released so that it may rise as indicated by the arrow on Fig. 1, the brake will be applied and motion will be imparted through the arm 21 and rod 24 to the cam lever 25 and cause the latter to move the carrier 8 in a manner to open the cut-out switch. When the carrier 8 is thus moved, the lug 9 thereon will rise and, if the controller drum is at other than "off" or first running position, the lug 13 will be out of the path of the projection $17^a$ of the lever arm 17 and the spring 18 will cause the arm 16 of the bell-crank to become disposed under the lug 9 of the carrier 8 and thus hold the cut-out switch open. It will be seen that under the conditions above described, the bell-crank-lever will act, in effect, as a spring-pressed latch, so that as the carrier 8 is turned to open the cut-out switch, the lug 9 will ride past the arm 16 and then become disposed over it, and thus the cut-out switch will become latched in open position.

Before the motor circuit can be closed, the controller must be returned to "off" or first running position. When the controller drum is so operated, the cam or lug 13 carried thereby will engage the projection $17^a$ of lever arm 17 and thus move the bell-crank-lever against the resistance of the spring 18, out of engagement with the lug 9 on the carrier, thus releasing the latter and permit the switch to be closed by the action of the spring 10.

It will be seen that my improvements serve to prevent the motor from being started while the brake is applied and the controller drum is at other than "off" or first running position.

Having fully described my invention, what I claim as new and desire to secure by Letters Patent, is:—

1. The combination with an electrical controller, a cut-out switch, means tending to close said switch, and switch operating means, of a latch operable to hold the switch open after it shall have been previously opened by said operating means, and means operable by movable member of the controller when the same is moved back to or approximately to "off" position, to trip the latch and permit the switch to close.

2. The combination with an electrical controller, a cut-out switch, and brake controlling means cooperable with the movable member of said cut-out switch, of a spring-pressed latch to hold the cut-out switch open when the same shall have been opened by the operation of the brake-controlling means, and means operable by the controller drum to trip said latch and permit the cut-out switch to close.

3. The combination with an electrical controller having a drum, a cut-out switch, means movably supporting the movable member of said cut-out switch, brake controlling means, and means operable by said brake controlling means to move the movable member of the cut-out switch to open the latter, of a spring-pressed latch between the controller drum and the movable member of the cut-out switch to latch the latter in open position, and means operable by the controller drum to operate said latch device to release the movable member of the cut-out switch and permit the latter to close.

4. The combination with an electrical controller having a drum and an operating shaft, and a cut-out switch, of a carrier for the movable member of the cut-out switch, movably mounted on said operating shaft, a lug on said carrier, brake controlling means to move said carrier to open the cut-out switch, a spring-pressed latch to cooperate with the lug on the carrier to hold the switch open, and a part movable with the controller drum to trip the latch and permit the cut-out switch to close.

5. The combination with an electrical controller, including a drum and an operating shaft, brake controlling means including a brake pedal, and a cut-out switch associated with the controller, of a carrier for the movable member of the cut-out switch, movably mounted on the operating shaft, a cam lever mounted on the shaft of the drum movably mounted on the shaft of the drum and cooperable with said carrier, means connecting said cam lever with the brake pedal whereby operation of the latter to cause the brake to be applied will cause said cam lever to move said carrier to open the cut-out switch, a spring-pressed latch cooperable with the carrier to hold the cut-out switch open, and means movable with the controller drum to trip said latch and permit the cut-out switch to close.

In testimony whereof, I have signed this specification in the presence of two subscribing witnesses.

CHARLES S. SCHROEDER.

Witnesses:
WM. H. DONALDSON,
CHARLES A. BERRY.